United States Patent
Zhuang et al.

(10) Patent No.: US 10,523,428 B2
(45) Date of Patent: Dec. 31, 2019

(54) METHOD AND APPARATUS FOR PROVIDING ASYMMETRIC CRYPTOGRAPHIC KEYS

(71) Applicant: Advanced Micro Devices, Inc., Santa Clara, CA (US)

(72) Inventors: Gongyuan Zhuang, Austin, TX (US); Thomas R. Woller, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 213 days.

(21) Appl. No.: 15/820,539

(22) Filed: Nov. 22, 2017

(65) Prior Publication Data

US 2019/0158278 A1 May 23, 2019

(51) Int. Cl.
*H04L 9/08* (2006.01)
*H04L 9/14* (2006.01)
*H04L 9/30* (2006.01)

(52) U.S. Cl.
CPC .......... *H04L 9/0822* (2013.01); *H04L 9/0861* (2013.01); *H04L 9/0877* (2013.01); *H04L 9/0894* (2013.01); *H04L 9/0897* (2013.01); *H04L 9/14* (2013.01); *H04L 9/302* (2013.01); *H04L 9/3033* (2013.01)

(58) Field of Classification Search
CPC ....... H04L 9/08; H04L 9/0816; H04L 9/0819; H04L 9/0838; H04L 9/0861
See application file for complete search history.

(56) References Cited

U.S. PATENT DOCUMENTS

| 6,658,578 | B1 | 12/2003 | Laurenti et al. | |
|---|---|---|---|---|
| 2009/0097637 | A1 | 4/2009 | Boscher et al. | |
| 2010/0318811 | A1 | 12/2010 | Motoyama | |
| 2012/0072723 | A1 | 3/2012 | Orsini et al. | |
| 2013/0108045 | A1* | 5/2013 | Sanders | ................ H04L 9/0847 380/260 |
| 2014/0086406 | A1* | 3/2014 | Polzin | ...................... G09C 1/00 380/44 |
| 2016/0147779 | A1 | 5/2016 | Eguro et al. | |
| 2016/0352509 | A1 | 12/2016 | Wu et al. | |
| 2018/0123792 | A1* | 5/2018 | Tu | .............................. H04L 9/06 |

* cited by examiner

*Primary Examiner* — Ponnoreay Pich
(74) *Attorney, Agent, or Firm* — Faegre Baker Daniels LLP (57) ABSTRACT

A method and apparatus provides cryptographic keys using, for example, a cryptographic co-processor (CCP) that uses spare processor cycles to work on cryptographic key generation in advance of the keys being needed by a requestor such as an application, or other process in the device. In one example, the cryptographic co-processor detects an idle condition of the CCP such as an idle condition of a cryptographic engine in the CCP. Control logic causes the CCP to generate at least one asymmetric key component corresponding to an asymmetric cryptographic key in response to detecting the idle condition. The method and apparatus stores the asymmetric key component(s) in persistent memory and generates the asymmetric cryptographic key using the stored asymmetric key component that was generated in response to detection of the idle condition of the CCP.

20 Claims, 5 Drawing Sheets

METHOD AND APPARATUS FOR PROVIDING ASYMMETRIC CRYPTOGRAPHIC KEYS

BACKGROUND OF THE DISCLOSURE

Secure communication of sensitive information between electronic devices or between components within a device over unsecured or secured channels has become commonplace with the development of methods to encrypt and decrypt such sensitive information. Two broad categories of these encryption techniques are symmetric and asymmetric encryption, both of which are widely used today. Symmetric encryption involves the use of a secret key known by both a transmitter and receiver of sensitive information. Using the same secret key, the transmitter can encrypt the data and the receiver can decrypt the data upon receipt. One often-utilized example of symmetric encryption is the Advanced Encryption Standard (AES), which uses a series of key-specific processing steps to transform an input message into an encrypted message and a series of corresponding decryption steps to retrieve the original message at the receiver.

Asymmetric encryption, on the other hand, utilizes two related keys: a public key and a private key. The public key is universally available and may be utilized by any transmitting device who wishes to send sensitive information to a particular receiver. The private key, however, which is necessary to decrypt the data encrypted with the public key, is known only by the receiver. Thus, any message that is encrypted and transmitted using the public key may only be decrypted in a reasonable amount of time by the receiver that possesses the corresponding private key. One prevalent asymmetric encryption algorithm is the Rivest-Shamir-Adleman (RSA) algorithm, which utilizes modular exponentiation to generate the public and private keys needed for secure communication. Another popular asymmetric encryption scheme is Elliptic Curve Cryptography (ECC), which is based on the algebraic structure of elliptic curves and assumes that finding the discrete logarithm of an elliptic curve with respect to a public base point is infeasible to compute.

Some devices employ multiple processors such as a central processing unit (CPU), a graphics processing unit (GPU) and a cryptographic co-processor (CCP). The cryptographic co-processor includes a cryptographic engine that can perform various cryptographic operations such as symmetric, asymmetric, hashing, digital signature signing, encryption, decryption and other cryptographic operations. The cryptographic co-processor is typically used to generate cryptographic keys such as asymmetric key pairs but typically do so in response to an application making a request for new keys, or through other request mechanisms requiring the CCP to generate key pairs on an as needed basis. For example, RSA key generation is a time consuming operation. With the key sizes linearly increasing, the generation time can be exponentially slower. For example, generation of 2048 bits for an RSA key or higher can be very time intensive for the CCP to generate keys. RSA key sizes are thought to need to be increased to 3072 bits or higher.

An improved technique is needed to generate asymmetric keys and provide the asymmetric keys to the appropriate requestor.

BRIEF DESCRIPTION OF THE DRAWINGS

The disclosure will be more readily understood in view of the following description when accompanied by the below figures and wherein like reference numerals represent like elements, wherein.

DETAILED DESCRIPTION OF EMBODIMENTS

Briefly, a method and apparatus provides cryptographic keys using, for example, a cryptographic co-processor (CCP) that uses spare processor cycles to work on cryptographic key generation in advance of the keys being needed by a requestor such as an application, or other process in the device. In one example, the cryptographic co-processor detects an idle condition of the cryptographic co-processor such as an idle condition of a cryptographic engine in the CCP. Control logic causes the CCP to generate at least one asymmetric key component corresponding to an asymmetric cryptographic key in response to detecting the idle condition. The method and apparatus stores the asymmetric key component(s) in persistent memory and generates the asymmetric cryptographic key using the stored asymmetric key component that was generated in response to detection of the idle condition of the CCP. The generated asymmetric key is encrypted using a cryptographic key associated with the CCP and is provided to the requestor in response to a key request from the requestor after the key has already been generated. As such, asymmetric cryptographic keys such as public/private asymmetric key pairs are created ahead of time before a requestor needs the keys, during idle times of the cryptographic co-processor. Idle conditions are tracked in any suitable manner such as by evaluating job queues associated with one or more of the cryptographic engines or the CCP.

In an embodiment, the apparatus and method detects another idle condition of the CCP, determines whether all cryptographic key components corresponding to the asymmetric cryptographic key have been stored, and in response to all corresponding asymmetric key components being generated, generates the asymmetric cryptographic key using the corresponding cryptographic key components, by the CCP.

In some embodiments, the apparatus and method mark the asymmetric cryptographic key as complete in a database and time stamp the asymmetric cryptographic key prior to encrypting the asymmetric cryptographic key.

In some embodiments, the apparatus and method encrypt the asymmetric key component prior to storing in the persistent memory. In other examples, the asymmetric key is an RSA key pair and the asymmetric key components include a prime number p, a prime number q, a value n=p*q where n is a modulus for both public and private key pairs, a value d=e^(−1) where e is a preconfigured public exponent. In some examples, the apparatus and method tests prime numbers p and q for cryptographic quality prior to storing the prime numbers p and q in persistent memory.

In some embodiments, providing the asymmetric key includes checking a time stamp associated with the asymmetric key to determine whether the key has an appropriate key lifetime, decrypting the key prior to sending to the requestor, deleting the key from a key database stored in persistent memory and initiating a new key generation process.

Figure 1:
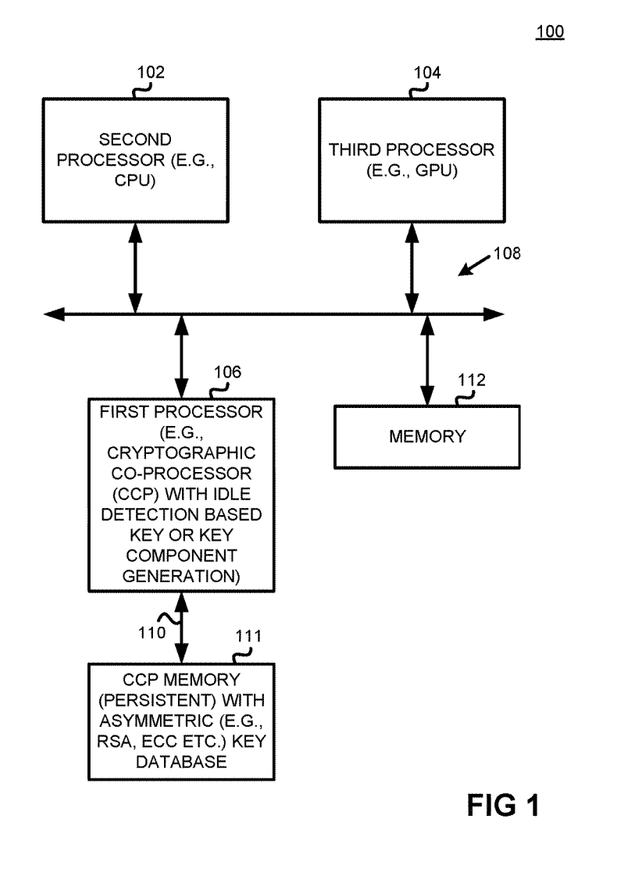
FIG. 1 illustrates a block diagram of one example of a device according to the disclosure.

FIG. 1 illustrates one example of an electronic device 100, such as a smart phone, tablet, laptop, web server, game console, printer, or any other suitable electronic device. In this example, the device includes a plurality of processors 102 and 104, such as a central processing unit and a graphics processing unit, and a cryptographic co-processor 106 operatively coupled through a suitable bus structure generally shown as 108 as known in the art. The processors 102 and 104 may be integrated in the same die, be on different dies and may include a plurality of different processing cores as known in the art. The cryptographic co-processor 106 in this example, has its own local persistent memory 111 which is accessible through bus 110 for security purposes. The electronic device 100 may also include memory 112 which includes any suitable memory architecture. The cryptographic co-processor 106 employs a type of idle condition detection to generate one or more cryptographic key components that are used to generate an asymmetric cryptographic key so that cryptographic keys can be generated during what would otherwise be idle cycle times of the CCP 106.

Figure 2:
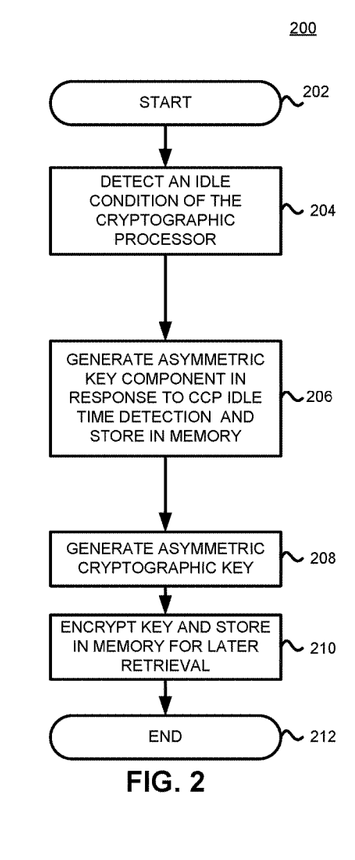
FIG. 2 is a flowchart illustrating one example of a method for providing cryptographic keys according to the disclosure.

Referring also to FIG. 2, a method of providing cryptographic keys 200 is shown and will be described with reference to the electronic device of FIG. 1. As shown by block 202, a key generation database has parameters that are set either through default values in control registers, through a user interface or policy certificates or in any other suitable manner. For example, RSA key size may be default to 2048 bit RSA keys or 3072 bit RSA keys or any other suitable key size. The number of keys to be generated during idle conditions may also be set so that, for example, 2 RSA keys of a particular size are generated. Also, the type of key to be generated is set as a default or programmable such as RSA key, ECC key, or other suitable asymmetric key. As such, a key generation database is maintained by the CCP and in one example these initial values are set through an API for a user to set the configurable parameters. Once the database parameters have been set, as shown in block 204, the method includes detecting an idle condition of the cryptographic co-processor 106. In one example, this is performed by idle time key component generation control logic in the form of firmware, one or more state machines, or any other suitable logic in the CCP. In one example, a job queue for the CCP is maintained by the processor 102 (CPU) under operating system control, application control or driver control as desired. Any requestor such as an application being executed on the CPU, or other process such as a process on the GPU that requires encryption, decryption or other cryptographic process by the CCP sends requests which are queued in a job queue. When the job queue is empty, the CCP detects an idle condition. However, any other suitable mechanism may be employed including the detection of an idle condition on a per-cryptographic engine basis where, for example, the CCP employs multiple cryptographic engines as known in the art.

As shown in block 206, the method includes generating at least one asymmetric key component corresponding to an asymmetric cryptographic key, such as an RSA key pair, in response to detecting the idle condition. As further described below, an asymmetric key component is a component that is used to generate an asymmetric key. Using an example of an RSA public/private key pair, the cryptographic key components may include, for example, prime number p, prime number q, a value n=p*q, a value d=e^(−1) where e is a preconfigured public exponent. However, any suitable asymmetric key component may also be generated in response to an idle condition being detected. The method also includes storing, by the CCP, the asymmetric key component that was generated, in, for example, the database in persistent memory 111 that in this example, is local to the CCP. However, it will be recognized that any suitable persistent memory may be employed. In one example, the persistent memory is static random access memory (SRAM). However, any suitable persistent memory including any suitable persistent virtual memory (PVM), non-volatile random access memory (NVRAM) or any other suitable memory may be employed.

As shown in block 208, the method includes generating the asymmetric cryptographic key using the stored asymmetric key component(s) that was generated in response to detection of an idle condition of the CCP. For example, as further described below, where multiple asymmetric cryptographic key components are used to generate an asymmetric cryptographic key, the CCP waits to generate the asymmetric cryptographic key until all asymmetric key components have been generated by the CCP.

As shown in block 210, the method includes encrypting the generated asymmetric key using a cryptographic key associated with the CCP. For example, where the CCP has a unique key (chip unique key CUK) which may be, for example, a private key of a public key pair or a symmetric key, the cryptographic asymmetric key is encrypted using the chip unique key and stored in the database in persistent memory 111. The key database hence is populated with completed asymmetric cryptographic keys that were generated during detected idle times so that the idle times are being used to generate key components that are used to generate the cryptographic keys. As shown block 212 the method ends which can include returning to block 204 if more keys or key components need to be generated.

In response to a key request from a requestor such as an application using the CPU, GPU or any suitable process that requires an asymmetric key, the CCP provides the asymmetric cryptographic key from the key database. As such, in one example, the key components are generated when the job queue is empty for the CCP and the cryptographic key is also generated during what would have been idle times on the CCP. An idle condition such as idle processing cycle times of the CCP are detected and used to generate one or more asymmetric key components and/or the asymmetric key prior to the key being requested by a key requestor.

Figure 3:
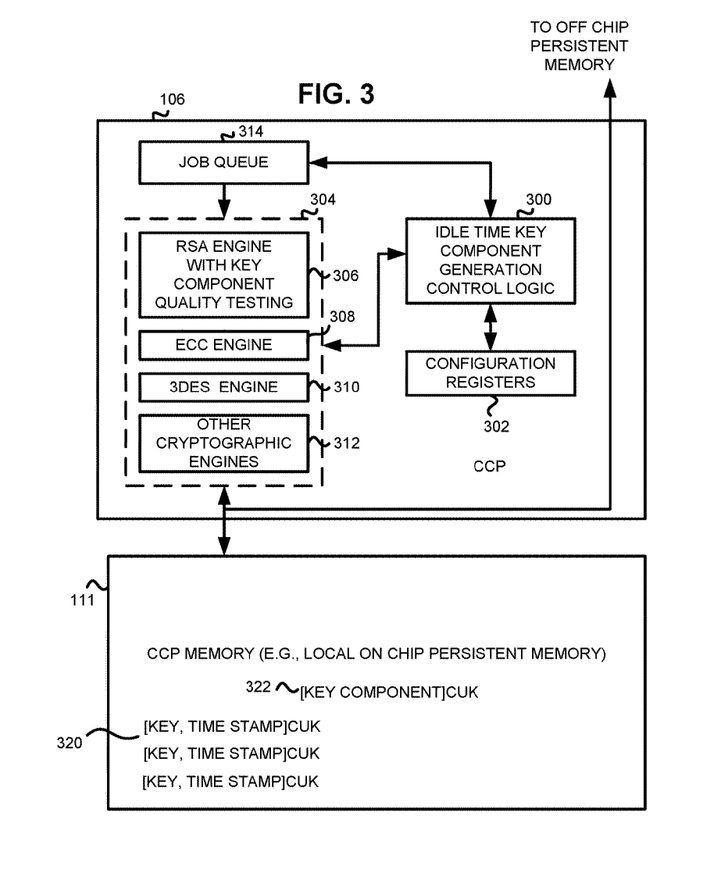
FIG. 3 is a block diagram illustrating one example of a processor such as a cryptographic co-processor in accordance with the disclosure.
Figure 4:
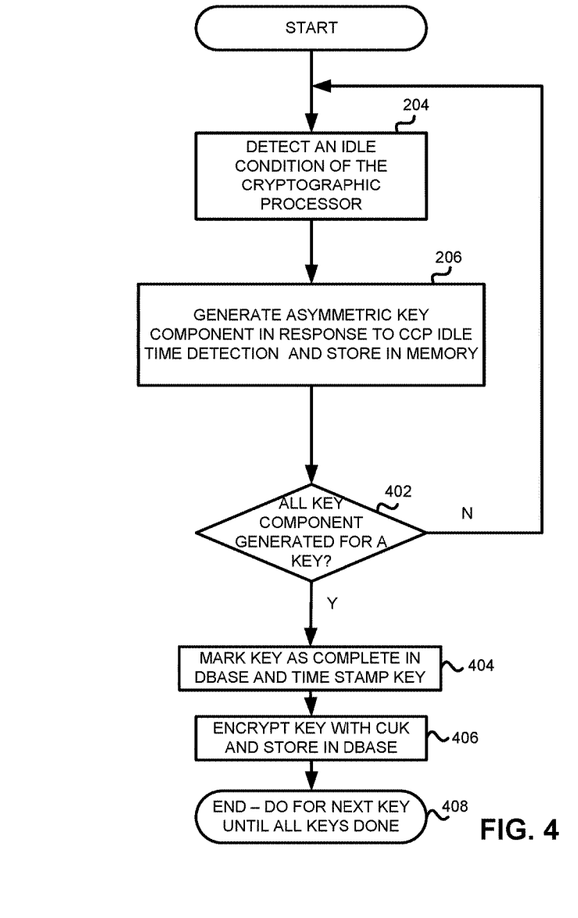
FIG. 4 is a flowchart illustrating one example of a method for providing cryptographic keys according to the disclosure.

Referring to FIGS. 3 and 4, one example of a CCP 106 that includes idle time key component generation control logic 300, configuration registers 302 and a plurality of cryptographic engines 304 is shown. In this example, the plurality of cryptographic engines include an RSA cryptographic engine 306, an elliptic curve cryptographic engine 308, a DES engine 310 and other desired cryptographic engines (e.g., AES encryption/decryption engine) 312. The CCP maintains the job queue 314. The job queue is monitored by the idle time key component generation control logic 300. In one example, monitoring includes detecting an interrupt generated by the CCP when the job queue 314 is empty. In this example, the control logic 300 is notified that the job queue is empty by a Queue Empty Interrupt generated by the CCP. The CCP provides the jobs from the requestors to the respective cryptographic engine. The control logic 300 as noted above, may be implemented in any suitable matter including firmware being executed by a processor within the CCP, state machine, or any other suitable structure as desired. Each of the cryptographic engines are controlled by the control logic 300 to generate respective key components and keys during idle times of the CCP or engines. In one example, register 302 specifies how many RSA keys are needed in the database and the corresponding RSA key size. For example, if the register 302 specifies that two RSA keys with key size 2048 bits are needed, then the CCP generates two RSA 2048 keys separately and stores them in the database.

Referring also to FIG. 4, in operation, the control logic 300 detects an idle time of the CCP such as when the job queue 314 is empty (step 204). If the job queue 314 is empty, the method generates one or more asymmetric key components and stores the generated key components in the persistent memory 111 in a database format or any other suitable format. This is shown in block 206 and is done by the control logic 300 controlling the respective engine 304 to generate the key components. In one example, the generated cryptographic key component is encrypted using the unique cryptographic key of the CCP as shown as key component entry 322. However, the key component in another example is not encrypted but is stored in persistent memory. As shown in block 402, the method includes determining whether all cryptographic key components corresponding to an asymmetric cryptographic key have been stored. For RSA keys in general, (n, e) are the public key, (n, d) are the private key; the CCP stores (n, e, d, p, q) as the key components. For ECC key generation, the CCP records the public key d and private key q (as provided, for example, by Federal Information Processing Standard FIPS PUB 186-4, National Institute of Standards Technology (NIST)) and its corresponding domain parameters.

If not all key components have been generated, the method continues to detect another idle condition of the CCP and performs another asymmetric key component generation for another key component needed to generate an asymmetric cryptographic key. In response to all corresponding asymmetric key components being generated, the method includes generating the asymmetric cryptographic key (e.g., pair (n, e) (n, d)) using the corresponding cryptographic key components as shown in block 404, including in this example, marking the key as complete in the database and timestamping the key. This is done prior to encrypting the asymmetric key. As shown in block 406, the CCP encrypts the completed asymmetric key with the chip unique key (CUK) and stores the cryptographic key in the database. This is shown as key entry 320. For example, the control logic 300 controls the encryption engine to encrypt the key. Also shown are key component entries 322 where key components corresponding to an asymmetric key are encrypted using the chip unique key and when all key components for a particular asymmetric key have been completed, the key component is decrypted and used to generate the asymmetric cryptographic key which is then time stamped and the key is encrypted using the CUK as shown as entry 320. As shown in block 408, the method continues until all asymmetric keys have been generated prior to their being needed by a key requestor.

Figure 5:
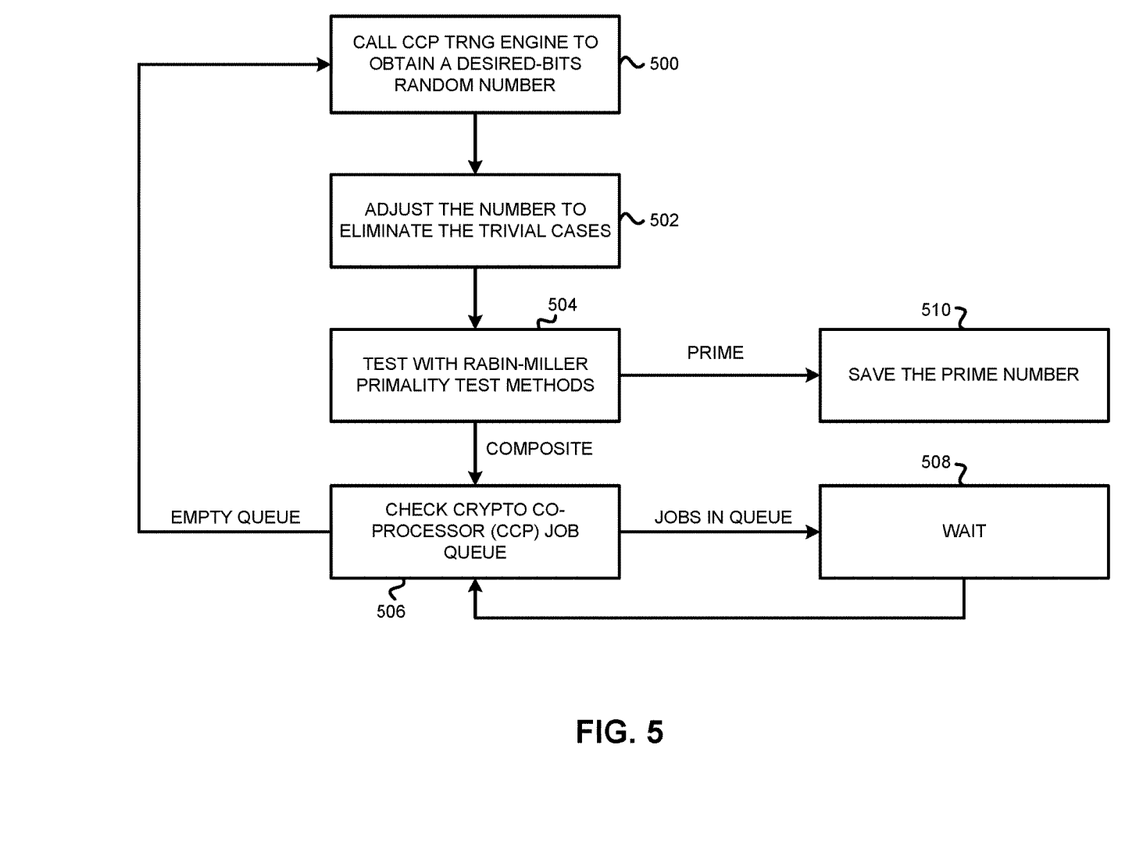
FIG. 5 is a flowchart illustrating one example of a method for providing cryptographic keys according to the disclosure.

Referring to FIG. 5, an example of RSA key generation is provided. The assumption is that the key database in persistent memory 111 has been configured with initial values including, for example, the key size of the RSA key needed, whether the public key is a fixed value, and the number of keys that are needed. As shown in block 500, the CCP generates a random seed value for RSA key generation by the control logic 300 calling a random number generation engine of the plurality of cryptographic engines 304 to obtain a desired bit length random number. The random number seed value is adjusted as shown in block 502 to eliminate trivial cases, for example, those numbers that can be divided by small prime numbers, such as 2, 3, 5, 7, etc. As shown in block 504, prime number generation (prime number p and prime number q) is based on a Rabin-Miller Primality Test whose tests are known in the art. If the primality test result is false, meaning a composite, then as shown in block 506, the method includes checking the job queue to determine if the job queue is empty. If the job queue is empty, then another random number is requested as shown in block 500. However, if there are jobs in the queue, as shown in block 508, the method waits until the job queue is empty. Referring back to block 504, if the primality test is true, meaning that the prime number is acceptable, the prime number p or q is saved as shown in block 510 in the key database as an asymmetric key component that in one example is encrypted and stored as a key component entry 322. As noted above, the cryptographic key component may be encrypted using the chip unique key if desired. The process continues until all key components are generated.

Figure 6:
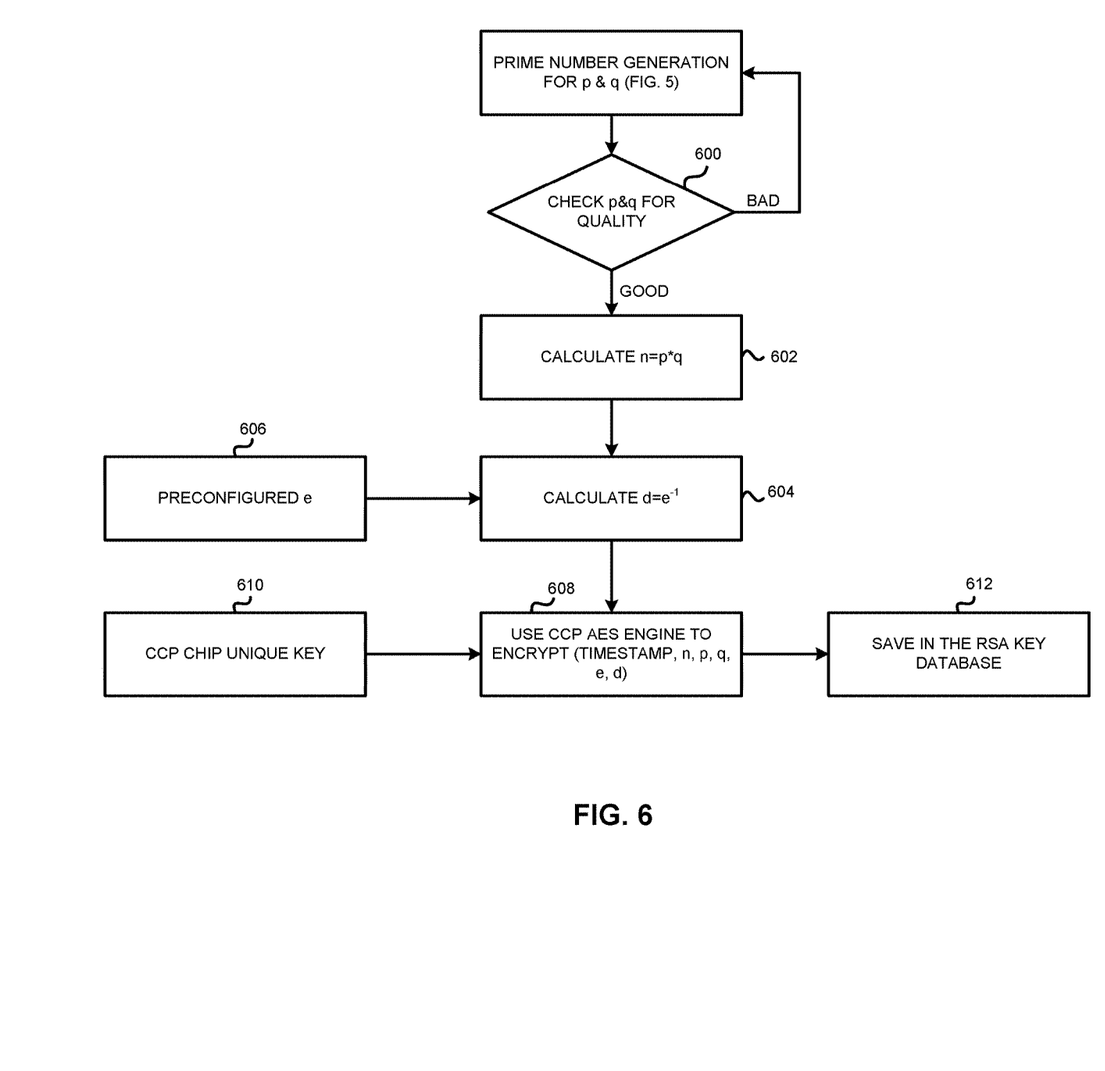
FIG. 6 is a flowchart illustrating one example of a method for providing cryptographic keys according to the disclosure.

Referring to FIG. 6, a method of providing cryptographic keys is illustrated as applied to an RSA asymmetric key pair. In this example, the asymmetric key is an RSA key pair and the asymmetric key components include a prime number p, a prime number q, a value n=p*q, and a value d=e^(-1) where e is a preconfigured public exponent. With the obtained prime numbers p and q from FIG. 5, a quality test is performed to determine whether the prime numbers p and q have a suitable cryptographic quality. For example, the prime numbers may be compared to see if they pass FIPS 186-4 requirements or any other suitable requirements as shown in block 600. If the p or q quality levels fail, a new prime number generation process as shown in FIG. 5 is repeated. The control logic 300 causes the RSA engine 306 to perform the tests. However, as shown in block 602, if the cryptographic quality of the prime number p or q is appropriate, the CCP calculates n=p*q and calculates d=e^(-1) as shown in block 604 using the preconfigured e shown in block 606. As such, the CCP tests the prime numbers p and q for cryptographic quality prior to storing the prime numbers p and q in persistent memory.

For key storage, the key components are stored. For example, RSA key pairs ((n, e) public keys and (n, d) private keys) are added with a timestamp as shown in block 608 to encrypt a key pair as well as the addition of a timestamp using the chip unique key as shown in block 610 and illustrated as key entry 320. The key owner knows (n, e) are public key and (n, d) are private key and (p, q) are for key owner's optimization usage (for performance), the key owner could discard (p, q) if preferred. An AES engine 312 in the CCP is used to perform the encryption. However, any other suitable encryption technique may be employed. The encrypted asymmetric key is then stored in the RSA key database as shown in block 612 as illustrated as key entry 320 (see FIG. 3).

Figure 7:
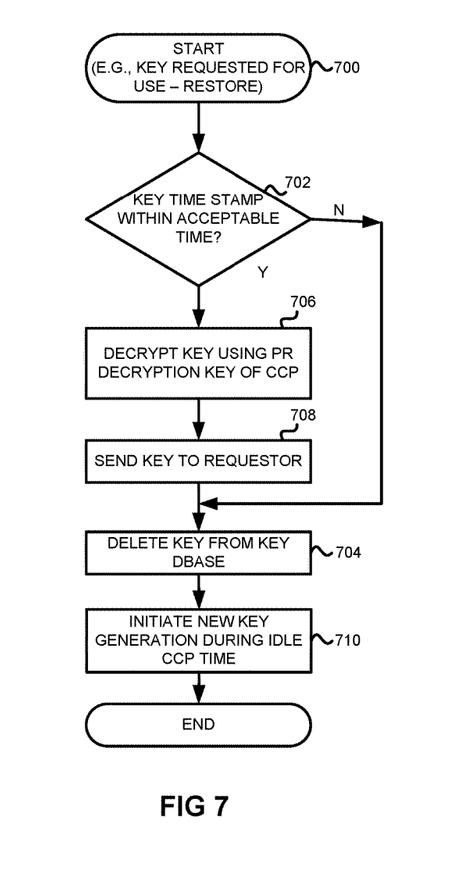
FIG. 7 is a flowchart illustrating one example of a method for providing cryptographic keys according to the disclosure.

Referring to FIG. 7, providing a cryptographic key to a requestor is described. In this example, an RSA cryptographic key is requested by a requestor, as shown in block 700. The control logic 300 checks the timestamp as shown in block 702 associated with the asymmetric key to determine whether the key has an appropriate key lifetime. For example, a time threshold is stored by the CCP in memory 111 and used. If the key is too old, meaning it has not been used in a desired amount of time, the key will be considered unusable and a different key will be provided. As such, the key will be deleted from the key database as shown in block 704 if the timestamp is inappropriate. As shown in block 706, if the key timestamp is appropriate, the method decrypts the key prior to sending the key to the requestor. This includes the AES engine using the private key of the CCP to decrypt the key which was encrypted using the public key of the CCP. As shown in block 708, the key is then sent to the appropriate requestor for use. After the key is sent to the application or other requestor, the CCP deletes the key from the database and as shown in block 710, initiates a new key generation operation during the idle CCP time.

As to database maintenance, using a preconfigured time interval, the control logic 300 checks whether timestamps have passed an expiration time as noted above. If so, the control logic 300 deletes the expired key and initiates a new key generation process to generate a new asymmetric cryptographic key. Because the RSA key pairs have been encrypted with the CCP unique key, the encrypted key database is maintained within the CCP in one example. However, this may limit the number of keys that can be generated. In another example, flash memory within the device may also be employed to store generated keys that have been generated at least in part during detected idle conditions of the CCP.

Among other advantages, spare processing cycles of the CCP are used to work on key generation operations. Asymmetric key components are generated during what would otherwise be idle times of the CCP to provide an efficient key generation process for the electronic device. Other advantages will be recognized by those of ordinary skill in the art.

The above detailed description and the examples described therein have been presented for the purposes of illustration and description only and not for limitation. For example, the operations described may be done in any suitable order and by any suitable component. It is therefore contemplated that the present embodiments cover any and all modifications, variations or equivalents that fall within the scope of the basic underlying principles disclosed above and claimed herein. Furthermore, while the above description describes hardware in the form of a processor executing code, hardware in the form of a state machine or dedicated logic capable of producing the same effect, other structures are also contemplated.

What is claimed is:

1. A method of providing cryptographic keys by an electronic device comprising at least a first processor and a cryptographic co-processor (CCP), the method comprising:
    detecting an idle condition of the CCP;
    generating at least one asymmetric key component corresponding to an asymmetric cryptographic key, by the CCP, in response to detecting the idle condition of the CCP;
    storing, by the CCP, the asymmetric key component corresponding to the asymmetric cryptographic key in persistent memory;
    generating the asymmetric cryptographic key using the stored asymmetric key component;
    encrypting the generated asymmetric key using a cryptographic key associated with the CCP; and
    in response to a key request from a requestor, providing the asymmetric cryptographic key.

2. The method of claim 1, further comprising when a cryptographic key component is generated:
    detecting another idle condition of the CCP;
    determining whether all cryptographic key components corresponding to the asymmetric cryptographic key have been stored; and
    in response to all corresponding asymmetric key components being generated, generating the asymmetric cryptographic key using the corresponding cryptographic key components, by the CCP.

3. The method of claim 2, further comprising:
    marking the asymmetric cryptographic key as complete in a database; and
    time stamping the asymmetric cryptographic key prior to encrypting the asymmetric cryptographic key.

4. The method of claim 1, further comprising encrypting the asymmetric key component prior to storing in the persistent memory.

5. The method of claim 1, wherein the asymmetric key is an RSA key pair and the asymmetric key components include a prime number p, a prime number q, a value n=p*q, a value d=e^(−1) where e is a preconfigured public exponent.

6. The method of claim 5, further comprising testing prime numbers p and q for cryptographic quality prior to storing the prime numbers p and q in persistent memory.

7. The method of claim 1, wherein providing the asymmetric key comprises:
    checking a time stamp associated with the asymmetric key to determine whether the key has an appropriate key lifetime;
    decrypting the key prior to sending to the requestor;
    deleting the key from a key database stored in persistent memory; and
    initiating a new key generation process.

8. An electronic device, comprising:
    a first processor;
    a persistent memory;
    a cryptographic co-processor (CCP), operatively coupled to the first processor and to the persistent memory, operative to:
        detect an idle condition of the CCP;
        generate at least one asymmetric key component corresponding to an asymmetric cryptographic key in response to detecting the idle condition of the CCP;
        store the asymmetric key component corresponding to the asymmetric cryptographic key in the persistent memory;
        generate the asymmetric cryptographic key using the stored asymmetric key component;
        encrypt the generated asymmetric key using a cryptographic key associated with the CCP; and
        in response to a key request from the first processor, provide the asymmetric cryptographic key to the first processor.

9. The device of claim 8, wherein when a cryptographic key component is generated, the CCP is operative to:
    detect another idle condition of the CCP;
    determine whether all cryptographic key components corresponding to the asymmetric cryptographic key have been stored; and
    in response to all corresponding asymmetric key components being generated, generate the asymmetric cryptographic key using the corresponding cryptographic key components.

10. The device of claim 9, wherein the CCP is operative to:
  mark the asymmetric cryptographic key as complete in a database in the persistent memory; and
  time stamp the asymmetric cryptographic key prior to encrypting the asymmetric cryptographic key.

11. The device of claim 8, wherein the CCP is operative to encrypt the asymmetric key component prior to storing in the persistent memory.

12. The device of claim 8, wherein the asymmetric key is an RSA key pair and the asymmetric key components include a prime number p, a prime number q, a value n=p*q, a value d=e^(-1) where e is a preconfigured public exponent.

13. The device of claim 12, wherein the CCP is operative to test prime numbers p and q for cryptographic quality prior to storing the prime numbers p and q in the persistent memory.

14. The device of claim 8, wherein the CCP provides the asymmetric key by:
  checking a time stamp associated with the asymmetric key to determine whether the key has an appropriate key lifetime;
  decrypting the key prior to sending to the requestor;
  deleting the key from a key database stored in persistent memory; and
  initiating a new key generation process.

15. An electronic device, comprising:
  a first processor;
  a persistent memory;
  a cryptographic co-processor (CCP), operatively coupled to the first processor and to the persistent memory, the cryptographic processor comprising:
    a plurality of cryptographic engines;
    idle time key component generation control logic operatively coupled to the plurality of cryptographic engines, the control logic operative to:
      detect an idle condition of a cryptographic engine of the plurality of cryptographic engines based on a job queue associated with the cryptographic engine;
      generate at least one asymmetric key component using the cryptographic engine corresponding to an asymmetric cryptographic key in response to detecting the idle condition;
      store the asymmetric key component corresponding to the asymmetric cryptographic key in the persistent memory;
      cause the cryptographic engine to generate the asymmetric cryptographic key using the stored asymmetric key component;
      cause the cryptographic engine to encrypt the generated asymmetric key using a cryptographic key associated with the CCP; and
      in response to a key request from the first processor, provide the asymmetric cryptographic key to the first processor.

16. The device of claim 15, wherein when a cryptographic key component is generated, the control logic is operative to:
  detect another idle condition of the CCP;
  determine whether all cryptographic key components corresponding to the asymmetric cryptographic key have been stored; and
  in response to all corresponding asymmetric key components being generated, generate the asymmetric cryptographic key using the corresponding cryptographic key components.

17. The device of claim 15, wherein the control logic is operative to cause the cryptographic engine to encrypt the asymmetric key component prior to storing in the persistent memory.

18. The device of claim 15, wherein the asymmetric key is an RSA key pair and the asymmetric key components include a prime number p, a prime number q, a value n=p*q, a value d=e^(-1) where e is a preconfigured public exponent.

19. The device of claim 18, wherein the cryptographic engine is operative to test prime numbers p and q for cryptographic quality prior to storing the prime numbers p and q in the persistent memory.

20. The device of claim 15, wherein the control logic provides the asymmetric key by:
  checking a time stamp associated with the asymmetric key to determine whether the key has an appropriate key lifetime;
  causing the cryptographic engine to:
    decrypt the key prior to sending to the requestor;
    delete the key from a key database stored in persistent memory; and
    initiate a new key generation process.

* * * * *